HEAVY MAINTENANCE SERVICE COMPUTER

Filed Oct. 26, 1967 5 Sheets-Sheet 1

INVENTORS:
THOMAS B. BISSETT
HAROLD BLAIR
JOHN B. MURPHY
MARTIN S. TATCH
By Smyth, Roston & Pavitt
ATTORNEYS

HEAVY MAINTENANCE SERVICE COMPUTER

INVENTORS:
THOMAS B BISSETT
HAROLD BLAIR
JOHN B. MURPHY
MARTIN S. TATCH

By Smyth, Roston & Pavitt
ATTORNEYS

INVENTORS:
THOMAS B. BISSETT
HAROLD BLAIR
JOHN B. MURPHY
MARTIN S. TATCH

By Smyth, Roston & Pavitt
ATTORNEYS

Fig. 5

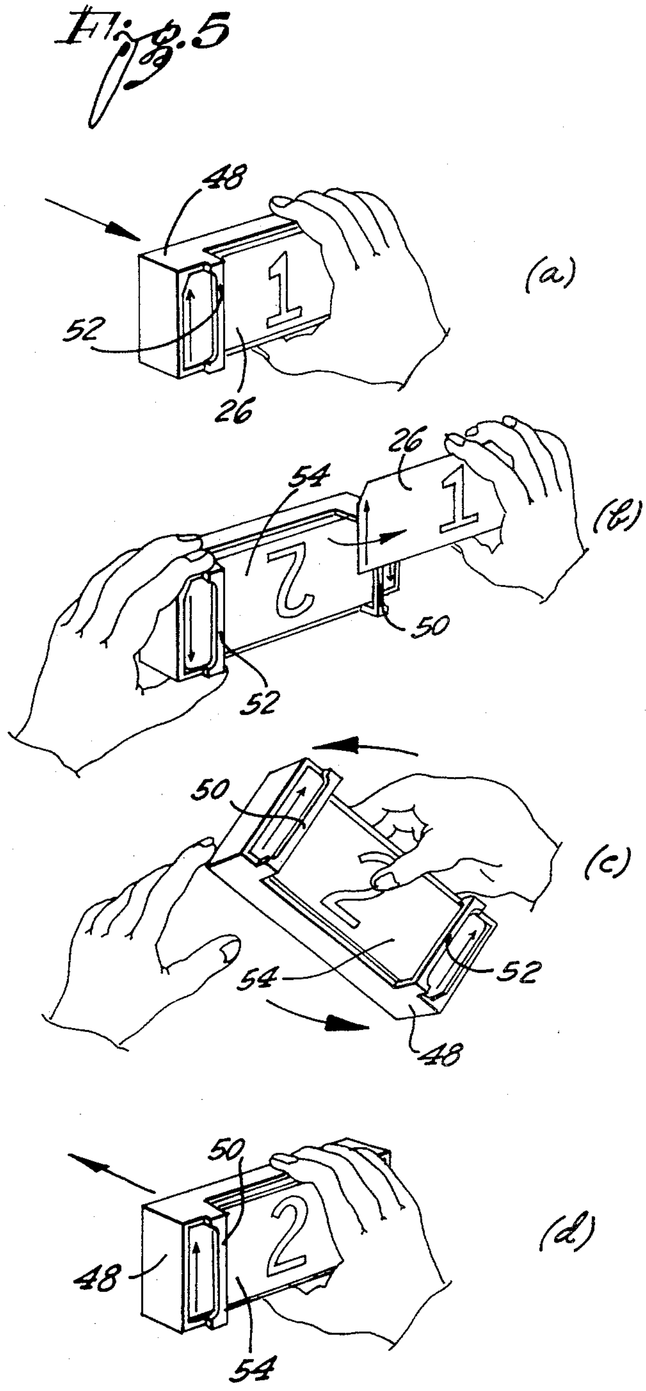

(a) Remove cartridge from computer (b) Remove data card, sign and date it. Note inverted printing on next data card.

(c) Rotate cartridge 180° so that arrows, legends and printing are in upright position.

(d) Re-install cartridge into computer, thus cycling computer for the next service interval.

INVENTORS:
THOMAS B. BISSETT
HAROLD BLAIR
JOHN B. MURPHY
MARTIN S. TATCH
By Smyth, Roston & Pavitt
ATTORNEYS

HEAVY MAINTENANCE SERVICE COMPUTER

Filed Oct. 26, 1967 5 Sheets-Sheet 5

INVENTORS:
THOMAS B. BISSETT
HAROLD BLAIR
JOHN B. MURPHY
MARTIN S. TATCH

By Smyth, Roston & Pavitt
ATTORNEYS

United States Patent Office 3,546,693
Patented Dec. 8, 1970

1 2

3,546,693
HEAVY MAINTENANCE SERVICE COMPUTER

Thomas B. Bissett and Harold Blair, Malibu, and John B. Murphy, Culver City, and Martin S. Tatch, San Diego, Calif., assignors to The Bissett-Berman Corporation, Santa Monica, Calif., a corporation of California Filed Oct. 26, 1967, Ser. No. 678,236
Int. Cl. G08b *5/00*
U.S. Cl. 340—309.1 24 Claims

ABSTRACT OF THE DISCLOSURE

This invention relates to a heavy maintenance service computer for monitoring the operation of a device requiring periodic servicing, and wherein the service computer is card controlled so that the service computer is automatically reset upon the insertion of a new card. Specifically, the service computer of the present invention may include a pair of electrochemical storage elements which provide for a transfer of an active material in accordance with the passage of current through the storage elements, and wherein one of the storage elements contains an initial charge of active material which is discharged in accordance with the operation of the device. As the one of the electrochemical storage elements is discharged, the other of the electrochemical storage elements is charged. Upon the discharge of all of the active material from the one of the electrochemical storage elements, the resistance of the one storage element rises, thereby controlling means to produce an output indication. The service computer may include a card holder containing a plurality of stacked cards and wherein the cards are visually alternated so that each time a card is removed and the card holder is reinserted into the service computer, the card holder must be rotated 180° to produce the proper visual orientation. The card holder may include means such as a permanent magnet which operates switches such as reed switches in the service computer to control the direction of the flow of current through both electrochemical storage elements. Each time a card is removed and the card holder is reinserted into the service computer, the flow of current is controlled to be opposite to the previous direction of the flow of current, thereby resetting the service computer. The present invention also includes the use of other means such as a plurality of notches in a control card to control the resetting of the computer.

Many types of heavy equipment now in use require periodic servicing. For example, service might be performed after every fifty-hour period of operation of the equipment. Currently the operation of the equipment is monitored by the use of hour meters which are operated in accordance with the operation of the equipment. These hour meters generally consist of a watch mechanism which is rewound by a solenoid at short time intervals, for example, every twenty seconds. The solenoid is controlled to be operated in accordance with the operation of the equipment. The hour meters of the prior art are quite inaccurate since the hour meters must be mounted on the equipment and the equipment is subjected to large shocks and vibrations which are not conducive to the accurate operation of the watch mechanism. Also, the hour meters have been found to be relatively short lived necessitating constant replacement. The combination of the inaccuracy of the hour meters plus their frequent replacement have made these meters a poor choice for monitoring the time of operation of heavy equipment so as to determine the service interval.

Another system which has been used to monitor the operation of the equipment uses a gear driven off of the engine in the equipment and with a conversion to hours by predetermined ratio which is the average for the revolutions of the engine to hours of use. Unfortunately, this type of structure is again inaccurate since the ratio can only be an average and does not reflect the action operation of the equipment. Therefore, some equipment is too frequently serviced while other equipment is not serviced often enough.

A third method for monitoring the operation of the equipment is through the use of a D-C clock. These D-C clocks are accurate but are quite expensive and suffer from the deficiency of being short lived. It can, therefore, be seen that it would be desirable to provide for a means of monitoring the operation of heavy equipment for determining a predetermined service interval with accuracy and reliability. The present invention is directed to a service computer which does determine the service interval reliably and accurately. In addition, the present invention includes a card control for automatically resetting the service computer after each servicing. Also, the card which is used to provide for the control of the service computer may also be used as part of a maintenance system so as to provide for accurate records of the servicing of each piece of equipment.

The service computer of the present invention includes first and second electrochemical storage elements. These electrochemical storage elements each include a pair of electrodes and each storage element also includes active material for transfer between the electrodes. The storage elements are interconnected so that as active material is discharged from a first one of the electrodes of one of the storage elements, active material is being charged to the first one of the electrodes of the other of the storage elements. After all of the active material has been discharged from the one electrode of one of the storage elements, the resistance of that storage element rises and this rise in resistance is used to provide an indication that service is required.

After the service has been performed, the service computer of the present invention is reset by providing for a flow of current through the storage elements so that the other of the storage elements now has the active material discharged from the one electrode while the one of the storage elements has the active material charged to the one electrode. The resetting of the service computer is automatically provided through the use of a control card which is inserted into the service computer. The control card controls the service computer so that the flow of current is in a first particular direction. When the computer determines that the service interval is up, the old control card is removed and a new control card is inserted to control the service computer so that the flow of current is in a second particular direction opposite to the first particular direction. The control cards may include information such as punched information so as to provide a record of the service which has been performed. In addition, the control cards may include information such as written information providing instructions as to the service that should be performed.

One particular structure which may be used so as to provide for the automatic resetting of the service computer of the present invention includes the use of a card holder which contains a stack of control cards. The service computer includes a pair of switches such as reed switches and the card holder includes a control device for the reed switches such as a permanent magnet. The control cards are arranged to be opposite in the orientation of the written information on the cards so that every other card is upside down. The card holder is initially inserted so that the first control card which is at the top of the stack is properly oriented so as to have the written information right side up. At this time, the permanent magnet controls one of the switches to provide for a proper flow of current.

After the service interval has elapsed, the resistance of one of the storage elements rises thereby providing an output indication that service is required. The service is then performed in accordance with the written instruction on the control card. After the service is performed, the first control card is removed, thereby disclosing the second control card. The second control card, however, contains written information which appears upside down relative to the written information on the first control card. The card holder is, therefore, rotated 180° so that the written information on the second card appears right side up, and the card holder is now inserted into the computer. The position of the permanent magnet relative to the service computer has now been changed so as to control the reed switches to produce a flow of current through the storage devices opposite to the previous flow of current, thereby automatically resetting the computer. The first control card may now be sent to a central file so as to keep a permanent and accurate record of the servicing of the equipment.

The service computer of the present invention may use other means of controlling the resetting of the computer after each service interval. For example, a movable permanent magnet may be included in the service computer and a first control card may contain a first opening at a particular position. When the first control card is inserted into the computer, the permanent magnet is moved to cooperate with the first opening in the first control card. The permanent magnet may be designed to close a reed switch to provide for a first particular direction of the flow of current through the storage elements. At the end of the service interval the first control card is removed and, after servicing, a second control card is inserted into the computer. The second control card has a second opening in a position different than the first opening in the first control card. The permanent magnet is, therefore. moved to correspond in position to the second opening, thereby providing an automatic resetting of the computer by producing a flow of current through the storage elements in a second particular direction opposite to the first particular direction.

It is also desirable to be able to interrogate the service computer while the equipment is inoperative. For example, the invention contemplates that when the service interval has elapsed, an output indication such as a visual indication would be produced continuously to remind the operator that service is required while the equipment is being operated. However, when the equipment is stored, either overnight or for some period of time, it is desirable to be able to interrogate the equipment without turning on the equipment, so as to produce an indication whether or not service is required. The present invention, therefore, incorporates means for interrogating the computer to determine whether service is or is not required.

Another problem which is encountered with the servicing of equipment such as heavy maintenance equipment is a laxness on the part of operators of the equipment in having the equipment serviced promptly after the service interval has elapsed. Therefore, the operators may operate the equipment for relatively long periods of time after the service computer indicates that service is required. The present invention includes means for storing additional information such as information in accordance with the overtime operation of the equipment after the service interval has elapsed or with the total time of operation of the equipment. The monitoring of the total time and overtime is cumulative and the storage of the total time and overtime information may be interrogated periodically to determine the total time or average overtime period. If it is determined that the average overtime period is sufficiently long, the situation can be rectified by reminding the employee of the proper servicing requirements for the equipment. It is to be appreciated that other types of information may be stored other than the total time and overtime information.

One major advantage of the service computer of the present invention is in the maintenance of records using the same card which is used to control the resetting of the service computer. Another advantage of the service computer of the present invention is the ease with which the service interval may be adjusted if it is determined that the service interval should be shortened or lengthened. The service interval may be changed by replacing the electrochemical storage elements or by adjusting the charge of active material in the electrochemical storage element.

The service computer of the present invention, therefore, is directed to a very simple and reliable system of providing for an accurate measurement of a service interval for a piece of equipment and of indicating to the operator of the equipment that service is required at the end of the service interval. The service computer of the present invention is relatively foolproof and may be subjected to severe shock, vibration and temperature conditions, without adversely affecting the accuracy and reliability of the instrument. In addition, the service computer of the present invention may be used as part of a complete maintenance program since the control cards may be stored so as to provide up-to-date information as to the servicing history of any particular piece of equipment.

A more general description of a service computer which monitors the operation of a device may be found with reference to application Ser. No. 561,817, filed on June 30, 1966, in the names of Thomas B. Bissett and Martin S. Tatch and assigned to the same assignee as the instant case. In addition, the description of a particular type of electrochemical storage element which may be used in the present invention may be seen with reference to application Ser. No. 519,634 filed Jan. 10, 1966, in the name of Martin Mintz and assigned to the same assignee as the instant case. A fuller description of a particular embodiment of the present invention may be had with reference to the following description and drawings wherein:

FIG. 5 illustrates in diagrammatic form the resetting of the service computer of FIGS. 1 through 4;

Figure 1:
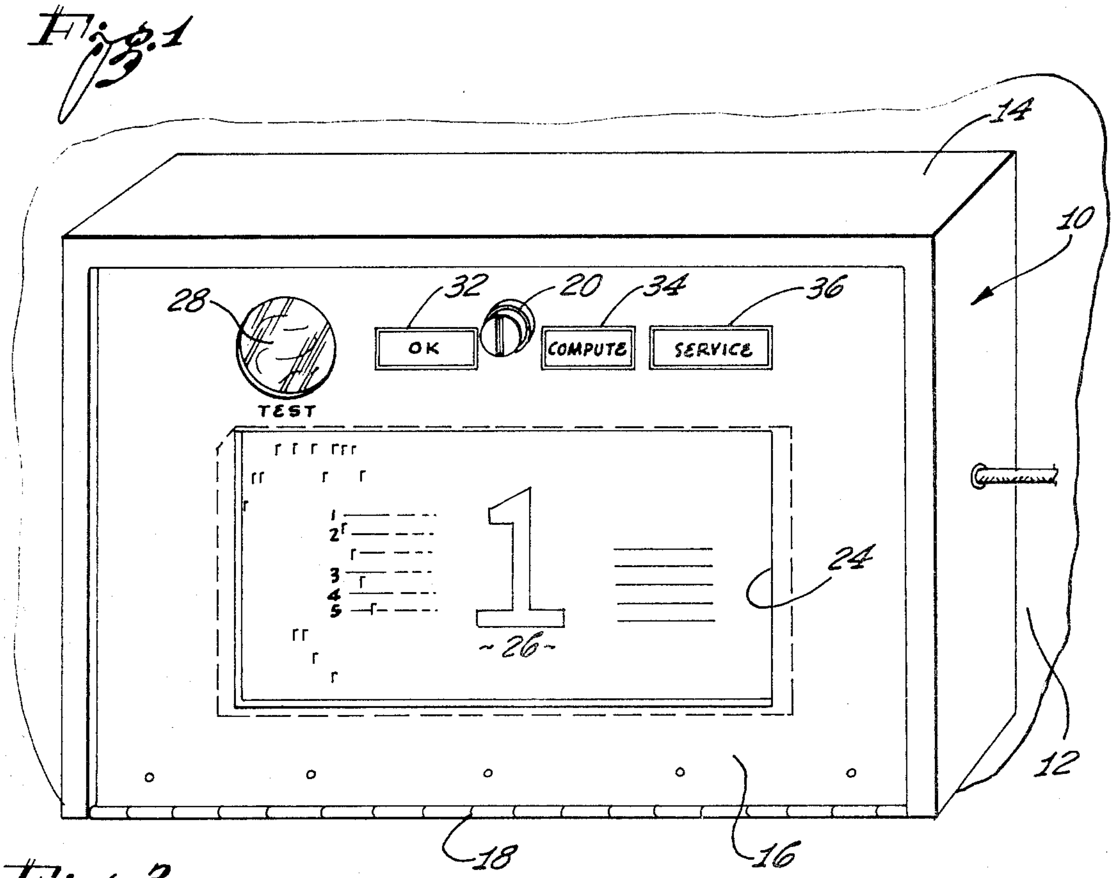
FIG. 1 illustrates the external configuration of a heavy maintenance service computer constructed in accordance with the teachings of the present invention.

In FIG. 1, a heavy maintenance service computer 10 constructed in accordance with the teachings of the present invention is shown. The heavy maintenance computer 10 may be mounted on a piece of equipment 12. The heavy maintenance service computer 10 includes an outer housing 14 which encloses the various components of the service computer 10. A front door 16 is hinged to the housing 14 by a hinge member 18. A locking screw 20 provides for the locking of the front door across the front of the housing 14 through the use of the nut 22 shown in FIG. 2.

The front door 16 includes a window 24 for visually inspecting a first control card 26 included in the service computer. In addition, the front door 16 includes a flexible member 28 which when depressed activates a test button 30 shown in FIG. 2. Three areas 32, 34 and 36 are used to provide output indications and the areas 32, 34 and 36 are back-lighted by output lamps 38, 40 and 42, shown in FIG. 2. The output areas 32, 34 and 36 are semi-transparent to allow the passage of light and the area includes various representative indicia such as the term "OK" in 32, "COMPUTE" in 34, and "SERVICE" in 36. When a particular one of the lamps 38, 40 or 42 is energized, the corresponding one of the output areas is back-lighted, as indicated above, to provide the output indication. In order to prevent light from the lamps from energizing all the areas, wall members 44 and 46 are used to isolate the light from each of the lamps.

Figure 2:
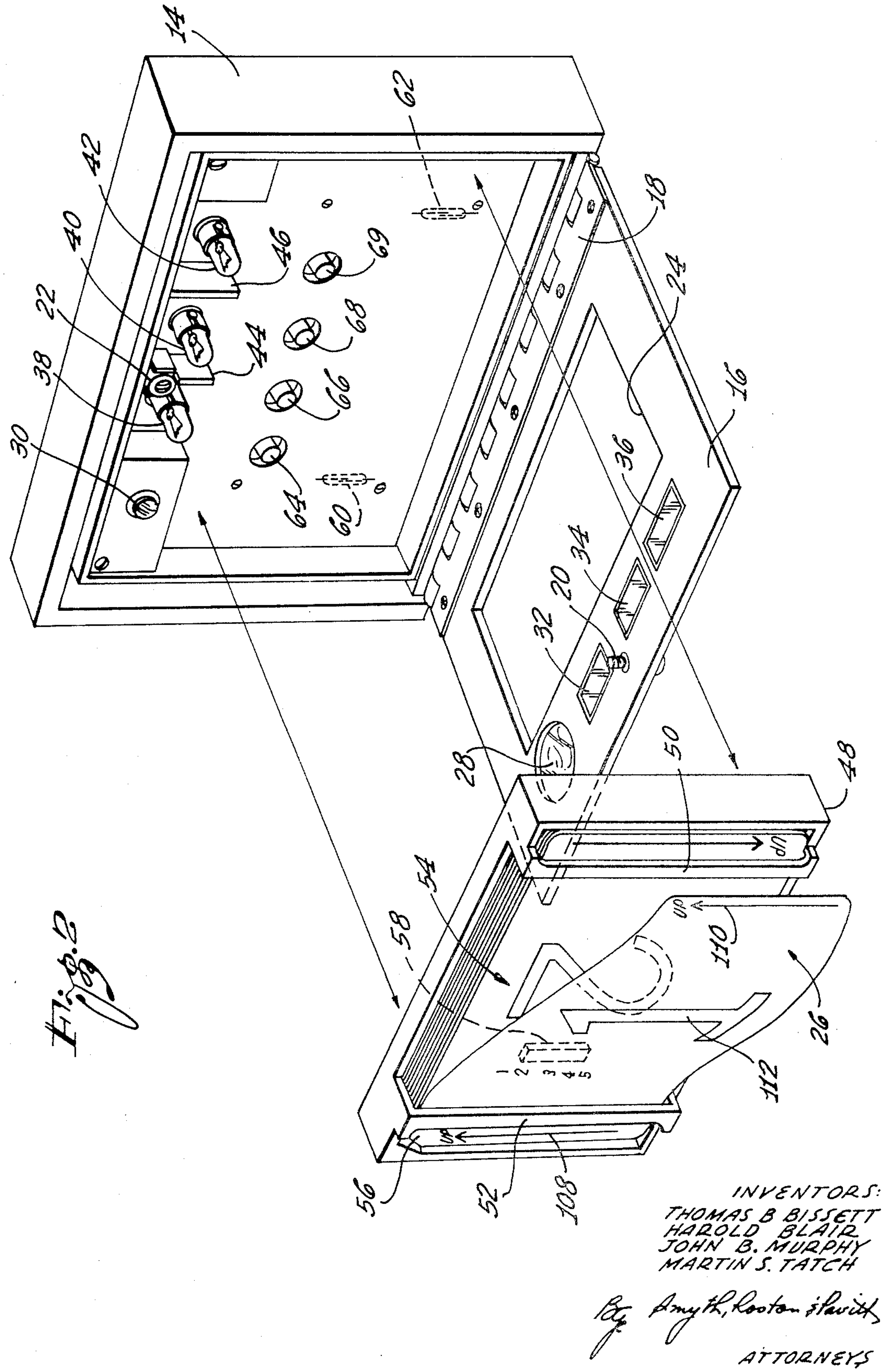
FIG. 2 is an exploded view of the heavy maintenance service computer of FIG. 1 illustrating the front door of the service computer in the open position and showing the card holder removed from the computer and with the first card partially removed from the card holder.

The card 26 plus a plurality of additional cards may be stacked in a card holder 48. The card holder 48 includes a pair of holding bars 50 and 52 to maintain the stack of cards in position. As seen in FIG. 2, the first card 26 has been partially removed showing a second card 54 underneath. It will be noted that the card 26 contains a large number "1" which is in a right-side-up position for an operator facing the service computer 10, whereas the card 54 contains a large number "2" which is upside down relative to the card No. 1. The use of this alternate positioning of the cards indicates to the service personnel that the card holder 48 is to be rotated 180° after the card 26 is removed and before the card holder 48 is reinserted into the service computer. Actually, the entire stack of cards in the card holder 48 alternates in orientation in accordance with these large numbers or other written indicia on the face of the card. The cards, however, may be standard punch cards and the cards may be stacked to have the punch card information oriented the same way for each card. For example, the angled portion 56 is in the same position for all cards even though the written information alternates.

The card holder 48 includes a permanent magnet 58 which is supported at the back and to one side of the card holder. Included within the service computer are a pair of magnetic reed switches 60 and 62 which correspond to the position of the permanent magnet 58 as shown in FIG. 2 and when the card holder 48 is rotated 180°. When the card holder 48 is inserted into the service computer with the orientation shown in FIG. 2, the permanent magnet 58 actuates the reed switch 60. When the card holder 48 is rotated 180° in order to orient the written information properly on the card 54, the permanent magnet 58 actuates the reed switch 62. It can be seen, therefore, that when the servicing of the equipment is finished and the card 26 is removed, the rotation of the card holder 48 automatically provides for alternate actuation of the reed switches 60 and 62. FIG. 2 also illustrates the physical position of our electrochemical storage elements 64, 66, 68 and 69 in the service computer 10. The particular operation of particular ones of these electrochemical storage elements is controlled by the actuation of the reed switches 60 and 62 in a manner to be described later.

Figure 3:
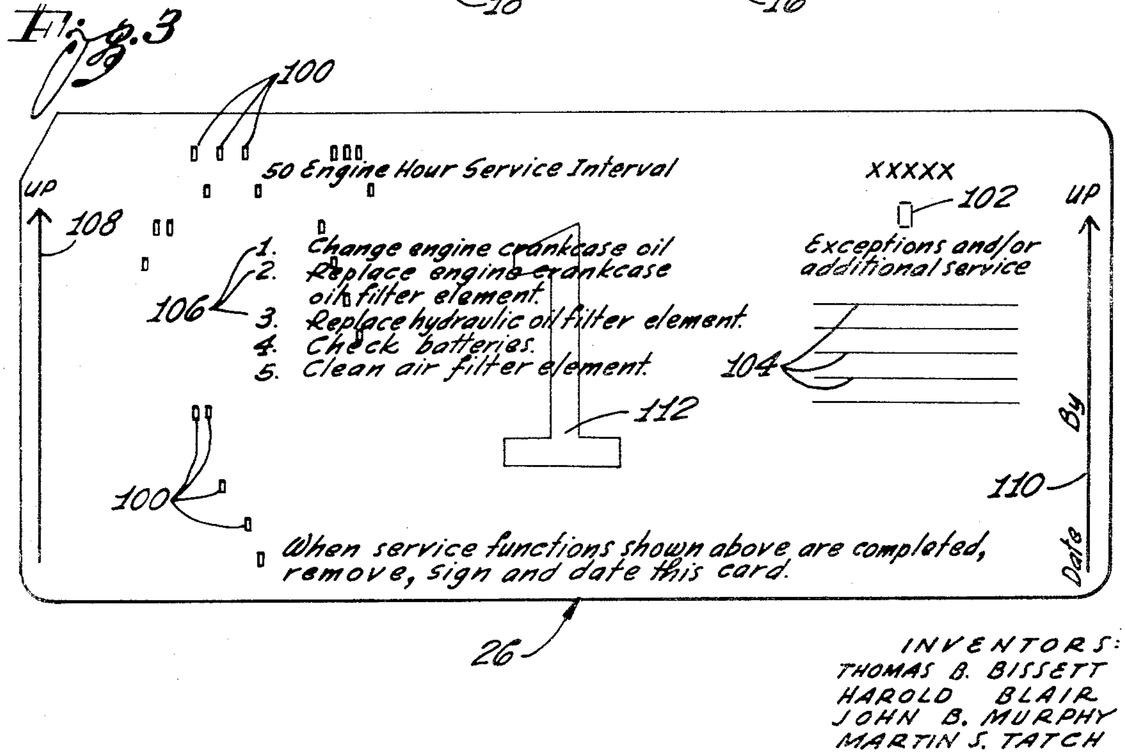
FIG. 3 is a detail showing of a control card which may be used in the service computer of the present invention.

FIG. 3 illustrates the card 26 of FIGS. 1 and 2 in greater detail. In FIG. 3 it can be seen that the card 26 may be a standard punch card containing punch openings 100 which may provide particular information to a data processing system. Specifically, the information may relate to the servicing of the equipment and each punch card may be maintained at a central data processing center after servicing, thereby providing a complete service record of the particular equipment. If service in addition to the normal service is required of the equipment or if there is some exception to the normal service, an area 102 may be removed from the punch card by the service personnel to provide an indication in the data processing system that there were exceptions or additions to the normal service. The particular exception or addition to the normal service may be noted on the lines 104 contained on the punch cards.

As a means of indicating to the service personnel the particular services which are regularly to be performed at the end of each service interval, the card 26 may include written information, such as information 106, which gives instructions to the service personnel as to the service to be performed at the end of the service period. It also may be seen that the card 26 may include arrows 108 and 110 in addition to a large numeral 112 and the other written information so as to indicate the proper position of the card. As shown in FIG. 2, the card 54 would be similar to the card 26 except the various printed material would be reversed 180° so that the card 54 would appear upside down when removing the card 26. The alternate relationship of the written material on the card facilitates the automatic resetting of the service computer.

Figure 4:
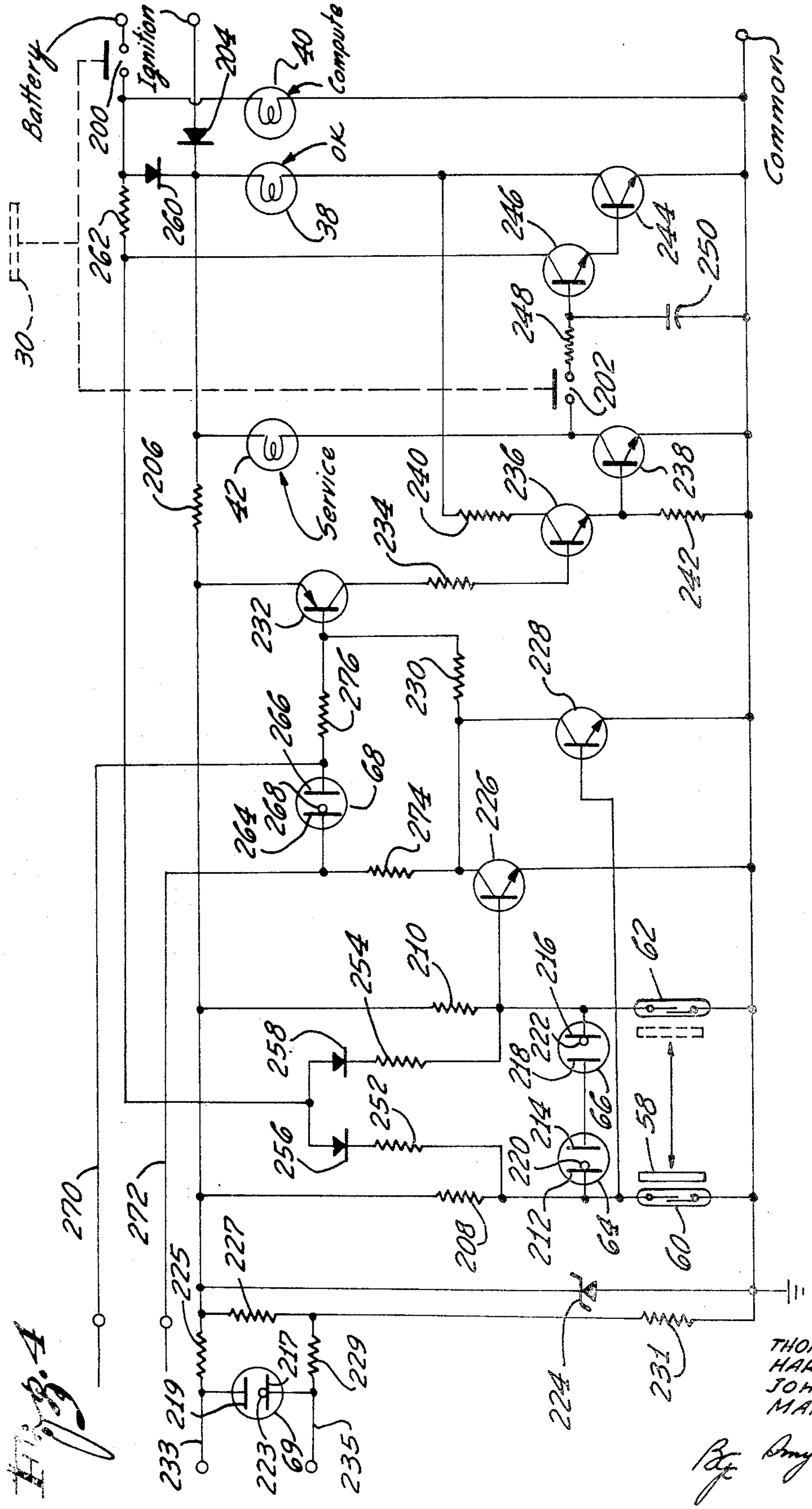
FIG. 4 illustrates a schematic of the circuitry included in the heavy maintenance service computer of the present invention.

FIG. 4 illustrates a schematic drawing of the circuitry of the service computer which is enclosed in the housing 14. As can be seen in FIG. 4, the circuitry includes the output lamps 38, 40 and 42, the reed switches 60 and 62, the electrochemical storage elements 64, 66, 68 and 69 and the test button 30. The test button 30 controls a pair of switches 200 and 202.

Normally the circuitry of FIG. 4 is connected to the ignition circuit of the equipment which is being monitored so that when the equipment is turned on, power is supplied to the circuitry of FIG. 4. The power is supplied to the electrochemical storage elements 64, 66 and 69 through a diode 204 and through a resistance circuit including the resistors 206, 208 and 210. The electrochemical storage elements 64, 66 and 69 each include a pair of electrodes. The storage element 64 includes electrodes 212 and 214, electrochemical storage element 66 includes electrodes 216 and 218, and electrochemical storage element 69 includes electrodes 217 and 219.

Active material is included within the storage elements. For example, active material 220 is included within the storage element 64, active material 222 is included within the storage element 66, and active material 223 is included within the storage element 69. The active material may be transferred between the electrodes by the passage of current through the storage element. The electrodes 212, 216 and 217 may be composed of a member having at least a layer of inert material, whereas the electrodes 214, 218 and 219 may be composed of a member having a relatively large amount of active material. For example, as shown in copending application Ser. No. 519,634 filed Jan. 10, 1966, in the name of Martin Mintz and assigned to the same assignee as the instant case, the electrodes 214, 218 and 219 would be the outer housing electrodes which have a relatively indefinite supply of active material, and the electrodes 212, 216 and 217 would be the inner electrodes which include at least a layer of inert material to receive the active material.

The storage elements 64 and 66 when inserted in the service computer of the present invention are designed to have a particular charge of active material on either of the electrodes 212 or 216. If we assume that the storage element 66 has a charge of active material 222 initially charged on the electrode 216, and we assume that the switch 60 is closed, the current flow from the ignition circuit would be through the storage element 66, the storage element 64 and the switch 60 to a reference potential such as ground. The current would be in the direction to discharge the active material 222 from the electrode 216 and charge this active material on the electrode 218. At the same time material 220 would be discharged from the electrode 214 and charged on the electrode 212. When all of the active material 222 is discharged from the electrode 216, the resistance of the storage element 66 increases to provide an output indication in a manner to be explained. The large increase in resistance of the storage element 66 reduces the current significantly through both storage elements 64 and 66 so that no significant amount of active material is charged on the electrode 212 after the resistance increases.

It can be seen that since the storage elements 66 and 64 are in series and receive the same flow of current, the storage element 64 receives the same charge of active material on the electrode 212 as was previously charged on the electrode 216 in the storage element 66. Therefore, upon reversal of the current through the storage elements 64 and 66 by opening the switch 60 and closing the switch 62, the current flow is now through the storage element 64, the storage element 66, and the switch 62 to ground so as to discharge the active material 220 and to charge the active material 222. The active material 220 and 222 is therefore charged and discharged within the storage elements by reversing the switches 60 and 62.

The flow of current from the ignition circuit and through the storage elements is in accordance with the operation of the equipment. A particular quantity of current will discharge a predetermined amount of active material so that by regulating the initial charge of active material and the level of current, the amount of time may be accurately determined. In order to insure a relatively accurate flow of current, a voltage regulator such as a Zener diode 224 is connected across the voltage supplied to the storage elements 64 and 66. The storage element 69 receives information whenever the ignition circuit is activated so as to provide a storage in accordance with the total time of operation of the equipment. Resistors 225, 227, 229 and 231 are used to provide a voltage divider circuit to provide a proper flow of current through the storage element 69. Output lines 233 and 235 are used to provide for an external reading of the total time of operation of the equipment. The information stored in the storage element 69 may be read out by passing current in an opposite direction to discharge the active material and by measuring the time and current necessary to provide a complete discharge.

The circuitry of FIG. 4 includes a pair of transistors 226 and 228 which operate as an "OR" gate. The output from the "OR" gate is coupled through resistor 230 to the base of a transistor 232. The output from the transistor 232 in turn is coupled through a resistor 234 to a circuit including a transistor 236 and a transistor 238. The operation of the transistor 238 controls the actuation of the light 42. A pair of resistors 240 and 242 operate as biasing resistors for the transistors 236 and 238. The collector of the transistor 236 is biased through the lamp 38 but the current which is drawn is not sufficient to produce a visible indication even when the transistor 236 is actuated.

The light 38 is controlled by a transistor 244 which in turn is controlled by a transistor 246. This combination of transistors 244 and 246 is connected to an R.C. delay circuit including resistor 248 and capacitor 250. The transistors 244 and 246 and the R.C. delay network are part of the compute circuitry which also includes the test button 30 and switches 200 and 202. In addition, the compute circuit includes resistors 252 and 254 plus diodes 256 and 258. A diode 260 is used to prevent an improper flow of current to the resistors 252 and 254 and diodes 256 and 258 when the ignition is on. A resistor 262 provides for the proper limitation on the current to the compute circuit.

Also included in the service computer of the present invention as shown in FIG. 4 is a storage circuit including the electrochemical storage element 68 for storing additional information. In the particular embodiment of FIG. 4, the electrochemical storage element 68 is designed to store overtime information but it is to be appreciated that other types of information may be stored. The storage element 68 has first and second electrodes 264 and 266 and includes active material 268 for transfer between the electrodes. The flow of current through the storage element 68 is always in a direction to charge active material to the electrode 264. In order to limit the current through the storage element 68 during the storage of overtime information, a pair of resistors 274 and 276 are used. When it is desired to read the amount of overtime accumulated by the storage element 68, a pair of output leads 270 and 272 may be used with an external reading device to provide a flow of current to discharge the active material 268 from the electrode 264. The amount of time and current necessary to provide for a full discharge of the active material in comparison with the rate at which the active material is charged to the electrode 264 is used to determine the time during which the equipment has been operated past the service interval.

In the operation of the service computer either the switch 60 or the switch 62 is closed, depending on the placement of the permanent magnet 58. It is assumed that the switch 60 is closed and that the service computer has just been reset. When the ignition circuit in the equipment is turned on, current flows through the diode 204, resistor 206, resistor 210, storage element 66, storage element 64 and switch 60 to the reference potential such as ground. As the equipment is operated, the active material 222 is discharged from the electrode 216 and charged to the electrode 218 while the active material 220 is discharged from the electrode 214 and charged to the electrode 212. When all of the active material 222 is discharged from the electrode 216, the resistance across the electrodes of the storage element 66 rises, thereby producing a rise in voltage at the electrode 216 which in turn produces a rise in the voltage at the base of the transistor 226.

The collector of the transistor 226 is biased through the base to emitter portion of the transistor 232 and when the voltage at the base of the transistor 226 rises, the transistor 226 turns on thereby turning on the transistor 232. When the transistor 232 turns on, this further controls the transistor 236 and transistor 238 is turned on. The service light 42 is now lit since the current from the ignition flows through the lamp 42 and the transistor 238 to ground. The light remains lit as long as the ignition circuit is energized, thereby providing a constant reminder to the operator of the equipment that service should be performed. On this type of heavy equipment it is important that the service be punctually performed.

When switch 62 is closed instead of switch 60 the operation is reversed wherein the discharge of all of the active material 220 from the electrode 212 provides a rise in the voltage at the base of the transistor 228 to control the transistor 228. The remaining portion of the circuitry operates in the same manner as disclosed above. When either transistor 226 or 228 is turned on in response to the discharge of the active material from either of the storage elements 66 or 64, the overtime storage element 68 is charged through the emitter-base portion of the transistor 232, the resistor 276, the storage element 68, the resistor 274 and through either transistors 226 or 228 to ground. The storage element 68 continues to accumulate a charge of active material on the electrode 264 for as long as the service has not been performed. The electrode 266 may have a relatively infinite supply of active material as indicated above in the reference to the electrodes 214 and 218. The overtime may be read out at any time by the use of the terminals 270 and 272. For example, it may be desired to periodically check the overtime over a relatively long period of time, such as six months, to see how much overtime has accumulated in this period of time. This overtime provision in the service computer allows for checking the efficiency of the service program without providing any indication of this checking to the service personnel.

It may also be desirable to check whether the equipment needs service without turning on the equipment. For example, every night when the equipment is stored it may be the task of one of the service personnel to check all the equipment to see which of the equipment is ready for servicing. This may be accomplished with the service computer of the present invention without turning on the ignition. Specifically, this is accomplished by using the test button 30 which closes the switches 200 and 202. When the test button 30 is pushed, current from the battery passes through the switch 200, and the compute light 40 to ground to indicate that the computer is checking whether service is required or not. Current also passes through diode 260, lamp 42, switch 200, resistor 248 and capacitor 250 to ground so as to charge the R.C. circuit of the resistor 248 and capacitor 250.

Although current flows through the lamp 42 when the test button is pressed, the current requirement of the lamp 42 is sufficiently great so that the current that flows is not sufficient at this time to produce a visual indication. Current also flows from the battery and through the storage elements 66 and 64 in a direction in accordance with the particular one of the switches 60 or 62 which is closed. The flow of current to the storage elements 64 and 66 while the R.C. circuit is charging provides for a discharge of a portion of the active material so as to provide for a complete discharge of the active material if only a small portion of active material remains. If the active material is discharged from the appropriate one of the storage elements one of the transistors 226 or 228 which form the "OR" circuit would be turned on which would in turn operate the service lamp 42 as indicated above. Therefore, the use of the R.C. circuit allows for a short testing of the appropriate one of the storage elements 66 and 64 to determine if service is imminent. Assuming that the appropriate one of the storage elements is not discharged even after the testing using the R.C. circuit, then the capacitor 250 charges up sufficiently to turn on the transistor 246 and the transistor 244 to produce a current flow through the lamp 38 and transistor 244 to ground. The lighting of the lamp 38 indicates that service is not required. If the service lamp 42 has been turned on because the appropriate one of the storage elements 66 or 64 has been discharged, it can be seen that the R.C. circuit cannot charge up to turn on the lamp 38 since the current from the battery would be diverted through the transistor 238.

When the test button 30 is activated, it can be seen that the current which flows through the appropriate one of the storage elements 66 and 64 is controlled by the resistance of the appropriate one of the resistors 252 and 254 and that the time during which this current flows is determined by the charging time for the capacitor 250 in the R.C. circuit. The current flow for the period that it takes to charge the capacitor 250 may be desired to be equal to a sufficient amount of operating time for the equipment so that the appropriate one of the storage elements would be discharged completely if discharge was imminent. For example, the activation of the test button 30 may be equivalent to 15 minutes of operating time for the equipment.

The diodes 256 and 258 are used to prevent a loop between the storage elements 66 and 64 when the service computer is not operating since these elements would have a tendency to go towards a state of equilibrium. Since the resistors 208 and 210 have a very large value in comparison to the resistors 252 and 254, it is not necessary to use diodes in this loop circuit.

It is to be appreciated that the overtime storage element 68 always receives a low current since the current through this overtime storage element is controlled by the resistors 276 and 274 which are designed to have a large value. It is also to be appreciated as indicated above that the diode 260 is used to prevent current from flowing to the diodes 256 and 258 when the ignition circuit is on. The diode 260, therefore, prevents any accidental discharge of the storage elements 66 and 64. The diode 204 is used to prevent the battery from being connected to the ignition when the test button 30 is activated.

FIG. 5 illustrates the operation of the service computer so as to automatically reset the computer. Normally the service program is started with the card holder 48 inserted in the service computer in the position shown in FIG. *5a*. The card holder 48 is removed by the operator after the service computer indicates that service is required and that service has been performed. The card 26 which has a large numeral 1 is removed from beneath the retaining members 50 and 52 to expose the card 54 containing the large numeral 2 as shown in FIG. *5b*. The card 54 now has its various written material appearing upside down. The operator, therefore, rotates the card holder 48 as shown in FIG. *5c* to the position shown in FIG. *5d* for reinsertion into the service computer. As shown with reference to FIG. 2 the rotation produces a relative change of the permanent magnet 58 so as to reverse the actuation of the reed switches 60 and 62 thereby providing for a reversal of the flow of current to the storage elements.

Figures 6, 7:
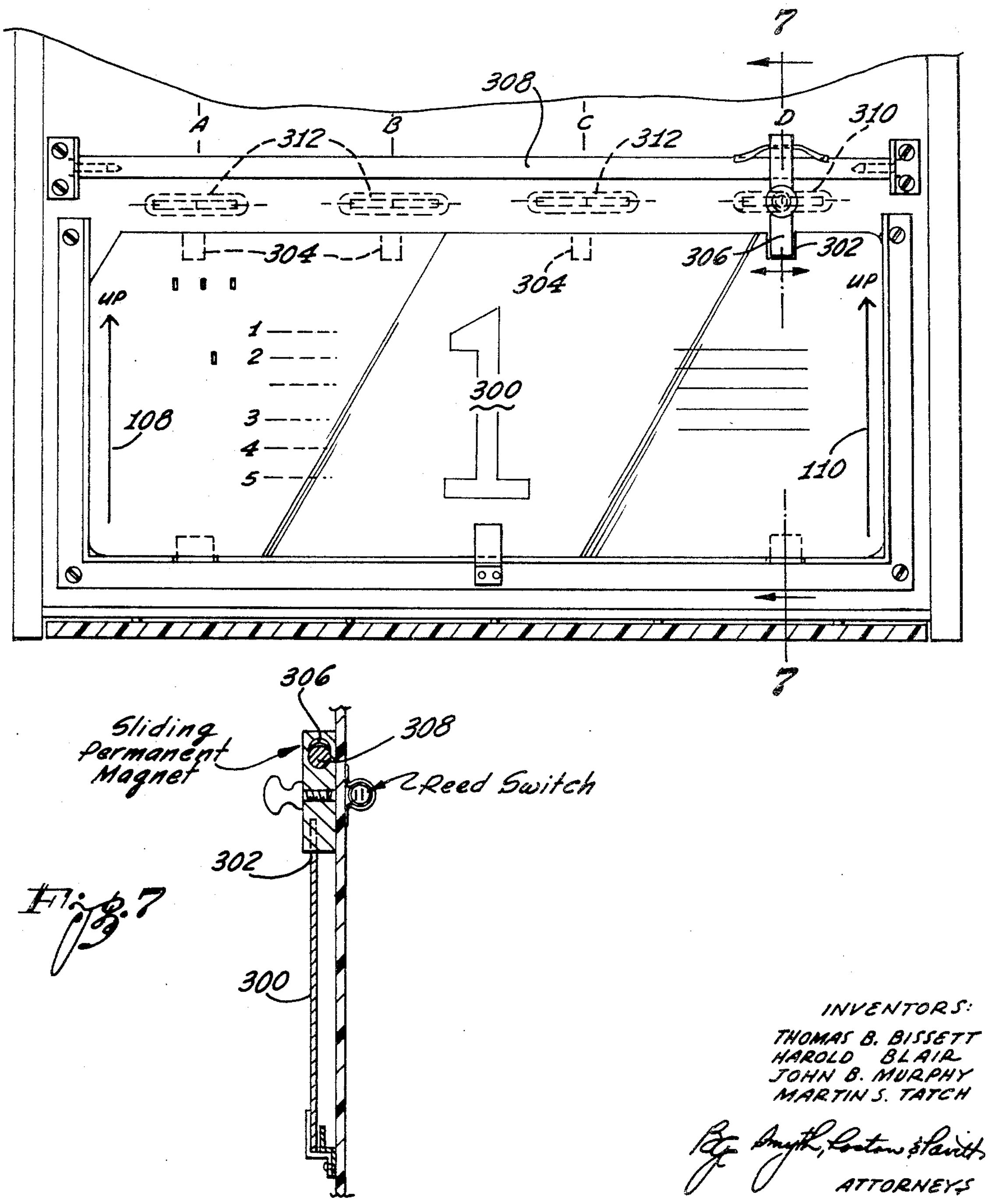
FIG. 6 illustrates an alternative embodiment of a control card which may be used to control the resetting of a service computer.
FIG. 7 is a cross-sectional view of the embodiment of FIG. 6 taken across line 7—7 of FIG. 6.

Although the invention has been illustrated with reference to a particular embodiment so as to provide for an automatic resetting of the computer, it is to be appreciated that other means may be used for an automatic resetting of the computer. For example, as shown in FIGS. 6 and 7 the card holder may be individually inserted into the service computer. The card 300 may include an opening at position 302 or may include openings at other positions such as at positions 304 shown in dotted lines. The service computer may contain a permanent magnet 306 which is supported in sliding relationship on a bar 308. Therefore, as the card 300 is inserted the magnet 308 is slid to the appropriate position so as to correspond to the slot 302. The position of the magnet may control a reed switch 310 in the same manner as shown with reference to FIG. 2.

When service is indicated, the card 300 may be removed and a new card having an opening corresponding to one of the openings 304 may be inserted. The permanent magnet 306 may therefore be moved to a position to correspond to the appropriate one of the openings 304 thereby providing for control of one of a group of reed switches 312. It is to be appreciated that using this type of structure, a plurality of positions on the cards may be used and a plurality of storage elements may be incorporated in the service computer so that the length of the service interval may be varied by supplying new service cards with appropriate openings. With the embodiment of the invention, shown in FIGS. 1 through 5, the length of the service interval may be varied either through the use of new storage elements or by resetting the storage elements to have a larger charge of active material. In either case, it can be seen that the service completer of the present invention is extremely versatile in providing for a resetting of the service interval.

The service computer of the present invention, therefore, provides for a reliable and accurate method of determining the service interval in the servicing of equipment such as heavy maintenance equipment. A clear and visible indication is given to the operator of the equipment that service is required. Means are also provided to allow service personnel to interrogate the computer to determine when service is required, even when the equipment is not operating. Once the service has been performed by the service personnel, a control card may be removed and maintained in a central file so as to provide for a record of the servicing of the equipment. A new control card is inserted into the computer and the insertion of the new control card provides for an automatic actuation of the computer to reset the computer for a new service interval.

The service computer of the present invention also includes means to store information in representation of additional data such as the total time of operation of the equipment and the operation of the equipment past the service interval. The overtime storage is cumulative so that the service computer may be periodically checked to determine how accurately the service program is being followed. It is to be appreciated that the service computer of the present invention has been described and explained with reference to particular embodiments but that adaptations and modifications may be made and that the invention is only to be limited by the appended claims.

We claim:

1. An automatically-controlled service computer for monitoring the operation of a device requiring servicing after operation for particular periods of time, including:

first and second electrochemical storage elements each containing a pair of electrodes and each containing active material for transfer between the electrodes of that electrochemical storage element to charge or discharge the active material from a first one of the pair of electrodes of that storage element in accordance with the direction of transfer, first means interconnecting the first and second electrochemical storage elements to obtain a discharge of active material from the first electrode in one of the storage elements and to obtain a charge of active material to the first electrode in the other of the storage elements in accordance with the direction of the flow of current through both storage elements, second means coupled to the first and second electrochemical storage elements for producing a flow of current through both the first and second storage elements in a particular direction in accordance with the operation of the device, and third means responsive to the discharge of the active material from the first electrode of either one of the first and second electrochemical storage elements for indicating the period of time of operation of the device after the active material has been discharged from such first electrode.

2. The service computer of claim 1 wherein the third means constitutes a third electrochemical storage element containing a pair of electrodes and containing active material for transfer between the electrodes.

3. The service computer of claim 1 wherein switching means are operative to control the direction of current flow produced by the second means and wherein means are provided for controlling the operation of the switching means.

4. The service computer of claim 2 wherein the third electrochemical storage element is connected in a circuit with switching means and wherein the switching means is responsive to the transfer of all of the active material from the first electrode of one of the first and second electrochemical storage elements for obtaining a transfer of active material between the electrodes in the third electrochemical storage element.

5. An automatically-controlled service computer for monitoring the operation of a device requiring servicing after periods of operation, including:

first and second electrochemical storage elements each containing a pair of electrodes and each containing active material for transfer between the electrodes in that electrochemical storage element to charge or discharge the active material from a first one of the electrodes of that storage element in accordance with the direction of transfer, first means interconnecting the first and second electrochemical storage elements to obtain a discharge of active material from the first electrode in one of the storage elements and to obtain a charge of active material to the first electrode in the other of the storage elements in accordance with the direction of a flow of current through both storage elements, second means coupled to the first and second electrochemical storage elements and to the first means for producing a flow of current through both the first and second storage elements in a particular direction in accordance with the operation of the device, third means coupled to the first and second electrochemical storage elements and the second means for producing a switching in the particular direction of the flow of the current through both storage elements, and fourth means coupled to the first and second electrochemical storage elements for testing for an interval to determine whether all of the active material on the first electrode of either of the first and second electrochemical storage elements is about to be transferred to the other electrode of that electrochemical storage element.

6. The service computer of claim 5 wherein the third means is a pair of electrical switches and wherein fifth means are provided for selectively controlling the operation of the electrical switches in the pair.

7. The service computer of claim 5 wherein the third means includes a pair of reed switches and further includes a permanent magnet for selectively controlling the operation of the electrical switches in the pair.

8. The service computer of claim 5 wherein fifth means are responsive to the transfer of all of the active material from the first electrode of either of the first and second electrochemical storage elements for indicating the period of time of continued operation of the device after such transfer.

9. The service computer of claim 8 wherein the fifth means includes third electrochemical storage element containing a pair of electrodes and active material on at least one of the electrodes in the pair, the active material being transferable between the pair of electrodes.

10. The service computer of claim 6 wherein the fifth means includes a control element containing positioning means to control the operation of the third means.

11. A service computer for monitoring the operation of a device requiring servicing after particular periods of operation, including:

first and second electrochemical storage elements each containing a pair of electrodes and each containing active material for transfer between the electrodes of that storage element to charge or discharge the active material from a first one of the pair of electrodes of that storage element in accordance with the direction of transfer, first means interconnecting the first and second electrochemical storage elements to obtain a discharge of active material from the first electrode in one of the storage elements and to obtain a charge of active material to the first electrode in the other of the storage elements in accordance with the direction of a flow of current through both storage elements, second means coupled to the first and second electrochemical storage elements for producing a flow of current through both the first and second storage elements in a particular direction in accordance with the operation of the device, third means including a pair of switches coupled to the first and second electrochemical storage elements and the second means for switching the direction of the flow of current through both storage elements in accordance with the individual actuation of the switches in the pair, fourth means coupled to the first and second electrochemical storage elements for indicating when all of the active material on the first electrode of either one of the first and second electrochemical storage elements has been transferred to the other electrode of that storage element, and fifth means coupled to the first and second electrochemical storage elements for testing whether the active material is about to be transferred from the first electrode of either one of the first and second electrochemical storage elements.

12. The service computer of claim 11 wherein sixth means are coupled to the first and second electrochemical storage elements for indicating the period of time, in the operation of the device, that the active material has been transferred from the first electrode of either one of the first and second electrochemical storage elements.

13. The service computer of claim 11 wherein the sixth means includes a third electrochemical storage element having a pair of electrodes and active material transferable between the pair of electrodes.

14. The service computer of claim 11 wherein the sixth means includes switching means responsive to the transfer of all of the active material from the first electrode of either of the first and second electrochemical storage elements for obtaining a transfer of the active material from the first electrode to the other electrode of the third electrochemical storage element during the continued operation of the device.

15. A service computer for monitoring the operation of a device requiring servicing after particular periods of operation, including:

first and second electrochemical storage elements each containing a pair of electrodes and each containing active material for transfer between the electrodes in that storage element to charge or discharge the active material from a first one of the electrodes of that storage element in accordance with the direction of transfer, first means interconnecting the first and second electrochemical storage elements and to obtain a discharge of active material from the first electrode in one of the storage elements and to obtain a charge of active material to the first electrode in the other of the storage elements in accordance with the direction of a flow of current through both storage elements, second means coupled to the first and second electrochemical storage elements for producing a flow of current through both the first and second storage elements in a particular direction in accordance with the operation of the device, switching means having first and second states of operation and normally operable in the first state and responsive to the transfer of all of the active material from the first electrode of either of the first and second storage elements to become operative in the second state, and third means coupled to the second means and responsive to the operation of the switching means in the second state to indicate the period of time that the device continues to operate without servicing.

16. The service computer of claim 15 wherein the third means includes a third electrochemical storage element containing a pair of electrodes and active material for transfer between the electrodes in the pair.

17. A service computer for monitoring the operation of a device requiring servicing after particular periods of operation, including:

first and second electrochemical storage elements each containing a pair of electrodes and each containing active material for transfer between the electrodes in that storage element to charge or discharge the active material from a first one of the electrodes of that storage element in accordance with the direction of transfer, first means interconnecting the first and second electrochemical storage elements to obtain a discharge of active material from the first electrode in one of the storage elements and to obtain a charge of active material on the first electrode in the other of the storage elements in accordance with the direction of a flow of current through both storage elements, second means coupled to the first and second electrochemical storage elements for producing a flow of current through both the first and second storage elements in a particular direction in accordance with the operation of the device, third means coupled to the first and second electrochemical storage elements to produce an output indication when all of the active material on the first electrode of either of the first and second storage elements has been discharged, and switching means responsive to the discharge of the active material from the first electrode of either of the first and second electrochemical storage elements for providing for a reversal of the direction of the flow of current through the first and second electrochemical storage elements.

18. The service computer of claim 17 wherein fourth means are provided for obtaining a test of the first and second electrochemical storage elements for an interval of time to determine whether all of the active material is about to be transferred from the first electrode of either of the first and second storage elements.

19. A service computer for monitoring the operation of a device requiring servicing after particular periods of operation, including:

first and second electrochemical storage elements each containing a pair of electrodes and each containing active material for transfer between the electrodes in that storage element to charge or discharge the active material from a first one of the electrodes of that storage element in accordance with the direction of transfer, first means interconnecting the first and second electrochemical storage elements to obtain a discharge of active material from the first electrode in one of the storage elements and to obtain a charge of active material on the first electrode in the other of the storage elements in accordance with the direction of a flow of current through both storage elements, second means coupled to the first and second electrochemical storage elements for producing a flow of current through both the first and second storage elements in a particular direction in accordance with the operation of the device, third means coupled to the first and second electrochemical storage elements for interrogating the storage elements for an interval of time to determine if the first electrodes of both of the storage elements contain active material in representation that the service interval has not expired or if the first electrode of either of the storage elements does not contain active material in representation that the service interval has expired, and fourth means for providing an output indication when all of the active material has been discharged from the first electrode of either of the first and second storage elements.

20. The service computer of claim 19 including fifth means operatively coupled to the third means to provide an output indication that the service interval has or has not expired in accordance with the operation of the third means.

21. A service computer for monitoring the operation of a device requiring servicing after particular periods of time, including:

first and second electrochemical storage elements each containing a pair of electrodes and each containing active material for transfer between the electrodes of that storage element to charge or discharge the active material from a first one of the electrodes of that storage element in accordance with the direction of transfer, each of the first and second storage elements having properties of providing an increased resistance between the electrodes of the storage element upon the discharge of all of the active material from the first electrode of that storage element, first means interconnecting the first and second electrochemical storage elements to obtain a discharge of active material from the first electrode in one of the storage elements and to obtain a charge of active material on the first electrode in the other of the storage elements in accordance with the direction of a flow of current through both storage elements, second means coupled to the first means for producing a flow of current through both the first and second storage elements in a particular direction in accordance with the operation of the device, third means responsive to the increased resistance between the electrodes of either the first or second storage elements to produce an output indication that service is required, and fourth means responsive to the increased resistance between the electrodes of either the first or second storage elements for indicating the period of time that the device continues to operate after the production of such increased resistance.

22. The service computer of claim 16 wherein the third means is operative to obtain a transfer of the active material from the first electrode to the second electrode in the third electrochemical storage element with the switching means in the second state.

23. The service computer set forth in claim 21 wherein the fourth means includes a third electrochemical storage element having a pair of electrodes and active material transferable between the electrodes in the pair.

24. The service computer set forth in claim 23 wherein the active material is transferable between the pair of electrodes in the third electrochemical storage element upon the occurrence of an increased resistance between the pair of electrodes in the third electrical storage element and wherein the third storage element provides an increased resistance between the pair of electrodes when all of the active material has been transferred from the first electrode of the third storage element.

References Cited

UNITED STATES PATENTS

| | | | |
|---|---|---|---|
| 3,343,083 | 9/1967 | Beusman | 324—68ETX |
| 3,423,648 | 1/1969 | Mintz | 317—231 |
| 3,430,200 | 2/1969 | Barney | 340—149 |

ALVIN H. WARING, Primary Examiner

M. SLOBASKY, Assistant Examiner

U.S. Cl. X.R.

317—231; 324—68; 340—149